United States Patent [19]

Pierart

[11] 4,355,001

[45] Oct. 19, 1982

[54] REACTOR UNIT AND A NUCLEAR INSTALLATION WHICH USES SAID REACTOR UNIT

[75] Inventor: Robert Pierart, Nantes, France

[73] Assignee: Societe Anonyme dite: Ateliers et Chantiers de Bretagne A.C.B., Nantes, France

[21] Appl. No.: 224,223

[22] PCT Filed: Oct. 18, 1979

[86] PCT No.: PCT/FR79/00095

§ 371 Date: Jun. 20, 1980

§ 102(e) Date: Jun. 20, 1980

[87] PCT Pub. No.: WO80/00893

PCT Pub. Date: May 1, 1980

[30] Foreign Application Priority Data

Oct. 20, 1978 [FR] France .............................. 78 29963

[51] Int. Cl.³ .......................................... G21C 23/00
[52] U.S. Cl. .................................. 376/317; 376/272; 376/264; 376/463; 376/909; 60/644.1
[58] Field of Search .............. 176/27, 30, 87, DIG. 3; 60/644, DIG. 4, DIG. 9, 644.1; 376/317, 272, 264, 268, 463, 909

[56] References Cited

U.S. PATENT DOCUMENTS

| | | | |
|---|---|---|---|
| 3,127,321 | 3/1964 | Borst | 176/38 |
| 3,164,525 | 1/1965 | Wetch | 176/33 |
| 3,208,914 | 9/1965 | Dickson | 176/30 |
| 4,056,435 | 11/1977 | Carlier | 176/DIG. 3 |
| 4,088,535 | 5/1978 | Thompson | 176/87 |

FOREIGN PATENT DOCUMENTS 1281815 12/1961 France .......................... 176/DIG. 3

*Primary Examiner*—Donald P. Walsh
*Attorney, Agent, or Firm*—Sughrue, Mion, Zinn, Macpeak & Seas

[57] ABSTRACT

A reactor unit and a nuclear installation which uses said reactor unit and a method of fitting up such an installation. Said installation includes mainly a reactor unit (2) which constitutes a shiftable module formed by a casing (7) and a stand (8), by a container unit (1) designed to accommodate the reactor unit (2) and by a module (3) for closing the container unit (1) and forming, for example, a swimming bath type storing unit for the used nuclear fuel. The installation of the invention may constitute a nuclear boiler which can be transported to the operation site in the form of an integral assembly or in separate components.

3 Claims, 1 Drawing Figure

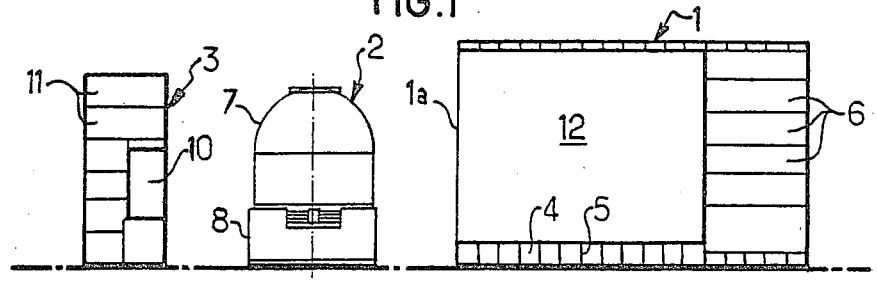
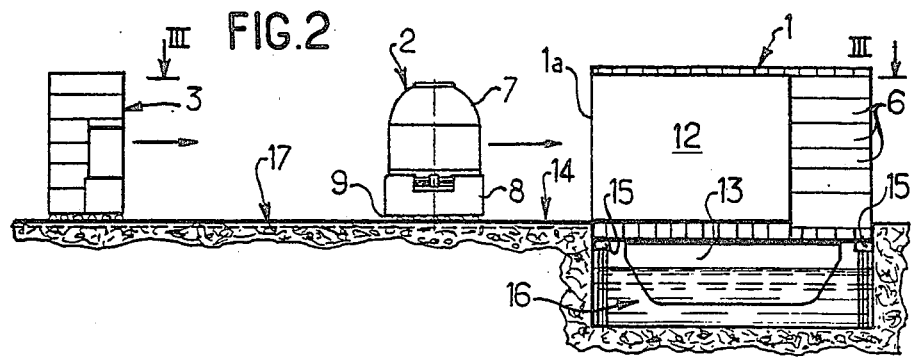
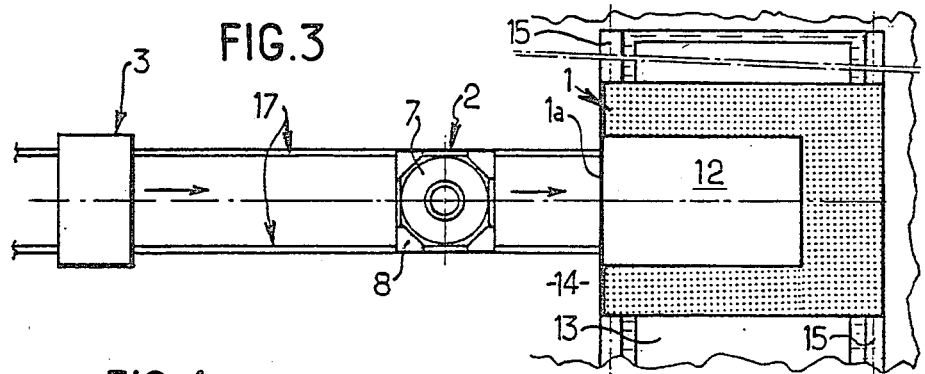
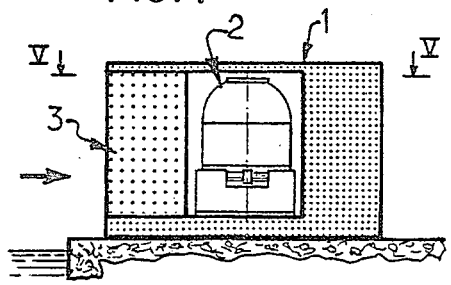
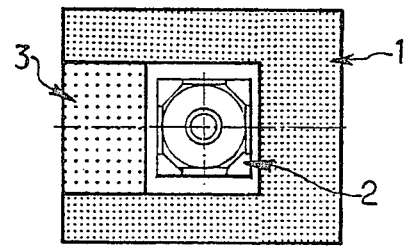

REACTOR UNIT AND A NUCLEAR INSTALLATION WHICH USES SAID REACTOR UNIT

FIELD OF THE INVENTION

The present invention relates mainly to a reactor unit and to an installation of the type which forms a nuclear boiler, for example, and uses such a reactor unit.

The invention also relates to a method of fitting up such an installation.

BACKGROUND OF THE INVENTION

Up till now, the various components which constitute a nuclear boiler have been manufactured in situ, i.e. at the chosen operation site. However, this has very numerous disadvantages. Indeed, when an installation is to be set up at a remote site or in a developing country, problems arise which relate to ground, labour, etc. and do not facilitate such manufacture or even make it impossible.

One of the main aims of the present invention is to overcome the above-mentioned disadvantages by providing a complete prefabricated nuclear installation which can be transported to the operation site.

In this connection, it must be stated that there are at present transport means such as barges, for example, which enable a complete prefabricated nuclear installation such as a boiler to be transported.

However, the conditions of access to the boiler installation site are often difficult and further, the total weight and bulk of such a boiler are considerable and make it difficult to prefabricate, handle and transport it in a single piece.

Therefore, the invention also aims to remedy the above drawbacks by providing in particular a nuclear installation constituted by prefabricated modular components which are separated and can be fitted together.

SUMMARY OF THE INVENTION

For this purpose, firstly, the invention provides a reactor unit of the type which includes a nuclear reactor installed on a support, wherein said reactor unit constitutes a module which can be shifted and/or transported and said support is constituted by a stand which also ensures stability of the reactor during operation.

It should also be noted that means for shifting are associated with the above-mentioned stand.

The invention also provides a nuclear installation which includes a reactor unit which has the above-mentioned characteristics, said installation constituting a complete nuclear boiler.

According to another feature of the invention, said complete nuclear boiler itself constitutes a transportable module.

According to yet another feature of the invention, the above-mentioned nuclear boiler is constituted by a plurality of modular components which can be fitted together.

According to yet another feature of the invention, the above-mentioned nuclear boiler consists of at least two modular components constituted by the above-mentioned reactor unit and a container unit which is designed to accomodate it and can be closed by a detachable closing component.

The invention further relates to a method of fitting up an installation such as defined hereinabove wherein the installation is in a prefabricated modular form and its modular components are previously checked and tested at the works before being transported to the operation site and assembled in situ.

It will therefore be understood that a nuclear boiler according to the invention can be divided into several components which can be transported separately and be assembled subsequently at the chosen operation site.

Further, in the method according to the invention the modules are assembled by successive insertion of the various modules in situ or, even, at the works.

Further, in the method according to the invention, the modules are assembled and loaded onto transport means and unloaded therefrom by horizontal handling methods.

Other features and advantages of the invention become more apparent from the following detailed description which refers to the accompanying drawings given only by way of example.

BRIEF DESCRIPTION OF THE DRAWINGS

FIG. 1 is a vertical elevational view which illustrates three modules which can constitute a nuclear boiler in accordance with the invention, namely, a container unit, shown in longitudinal cross-section and a reactor unit and a swimming bath type storage unit shown in elevation;

FIG. 2 is a similar vertical elevational view which illustrates the above three modules being loaded before transport;

FIG. 3 is a cross-section along line III—III of FIG. 2;

FIG. 4 is an elevation with a partial longitudinal cross-section of the complete boiler;

FIG. 5 is a cross-section along line V—V of FIG. 4.

DESCRIPTION OF THE PREFERRED EMBODIMENT

In accordance with one embodiment and with reference to the accompanying drawings, a nuclear boiler which works on the principles of the invention mainly includes three elementary modules made and checked in the workshop, these being, namely: a container unit or block 1, a reactor unit 2 and a unit 3 which forms a swimming bath type storing unit for used nuclear fuel elements.

The reactor unit 2 which is the main subject of the present invention is constituted by a casing 7 which contains, in particular, a vessel and steam generators which are not shown since they do not form a part of the present invention. The casing 7 and its contents are supported by a stand 8 with which shifting means are associated. Said means are schematically illustrated at 9 in FIG. 2 and allow the reactor unit 2 to be shifted by rolling or sliding.

Here, it should be added that the stand 8 is suitably arranged and includes separate cells or compartments one of whose features is that they allow nuclear safety circuits to be installed. Further, it is important to note that said stand is used advantageously to ensure stability of the reactor 2 during operation. More precisely, the stand 8 allows even distribution of the reactor's weight on the bottom of the container unit 1 which will now be described.

The container unit 1 is in the form of a rectangular module open at 1a. It has a double bottom 4 reinforced by partitions or the like 5, as well as chambers 6 which form compartments in which, in particular, boiler auxiliary operation circuits are installed.

The container unit 1 may be closed by a closing part which, in accordance with the embodiment illustrated, is a unit 3 which forms a swimming bath type storing unit for used nuclear fuel. Reference 10 is a portion of the module 3 which forms the actual swimming bath and a number of cells or compartments 11 contain in particular various control and connection circuits.

The prefabricated modules 1, 2 and 3 are assembled at the works or in situ as follows.

The reactor unit 2 is inserted in the cavity 12 formed inside the container unit 1 and constituting the main nuclear compartment of the boiler. Then, the module 3 which, for example, forms the swimming bath type storing unit is fitted between the top wall and bottom wall of the container unit 1 so as to close said unit and to form the completely assembled boiler such as shown in FIGS. 4 and 5. The various modules will obviously be mechanically and electrically connected together as necessary. This is facilitated by providing separate compartments both in module 1 and module 3 and in the stand 8 which carries the reactor 2 as previously described.

As mentioned at the beginning of the present specification, an installation in accordance with the principles of the invention can constitute a complete nuclear boiler which forms a module which can be transported to the operation site. Therefore, with reference to FIGS. 2 and 3, a method is now described by way of example for handling and transporting the boiler. The container unit or block 1 is brought on its supports or stringers 15 provided on the sides of a tank 16 which is, for example, a shipyard dock with an adjustable level and is adjacent to a loading quay 14. The reactor unit 2 and the closing unit 3 of the nuclear unit 1 are inserted successively in the cavity 12 of the nuclear unit 1. These components are placed in the container unit 1 e.g. by rolling along a railway line illustrated schematically and referenced 17.

Then, by lowering the water level in the tank 16, a barge 13 is brought into said tank and under the container unit 1. This may also be done by ballasting the barge 13. Then, by unballasting the barge or raising the water level in the tank 16, the barge is raised under the container unit 1. From then on, the nuclear boiler is ready to be transported to the chosen site.

It is important to note here that the handling of the nest of the modules 1,2,3 which has just been described does not require the use of cranes since the shifts of said modules to fit them together consist mainly of translations in a substantially horizontal plane.

Lastly, as specified at the beginning of the specification, the modules 1,2 and 3 can advantageously be transported separately (and this may be necessary when the conditions of access to the site are difficult, i.e. when the water level is not high, for example, in which case, one barge will transport only the container unit, for example, and the reactor unit 2 and the closing unit 3 will be transported on another barge. It should be noted, by the way, that rails may be provided on said second barge so that by connecting said rails to the railway lines 17, the modules can be made to travel along them directly onto said barge to which said components are then solidly secured. Once the modules 1, 2 and 3 reach the site, they are assembled in situ by fitting them together to form a complete boiler as illustrated in FIG. 4.

Therefore the boiler in accordance with the invention has a modular structure formed by several nested units whose dimensions are limited as a function of the transport means, said units being manufactured and tested at the works and being transportable in the form of an integral assembly or even separately—a considerable advantage, since the modules may be several tens of meters long and weigh thousands of tonnes, especially the container unit 1.

Of course, the invention is in no way limited to the embodiment described and illustrated which is given only by way of example. The principles of the invention may thus be applied to reactors other than nuclear boilers without going beyond the scope of the invention.

The invention includes all the technical equivalents of the means described, as well as the combinations thereof if they keep within the spirit of the invention and are put into application within the scope of the appended claims.

I claim:

1. A modular stationary nuclear boiler including:
   a nuclear reactor;
   at least one steam generator connected to said reactor;
   a metal casing housing said reactor and said generator;
   and auxiliary boiler equipment;
   the improvement comprising:
   a horizontally movable stand supporting said casing such that said stand and its contents constitutes a horizontally transportable modular reactor unit, and wherein said stand insures the stability of the reactor unit during both operation and transport;
   said modular nuclear boiler further including a horizontally transportable metal structure container unit, said metal structure transportable container unit comprising an internal chamber sized to receive said stand installed metal casing bearing said at least one steam generator and said nuclear reactor and to encompass the same, an opening within a side of said metal structure container unit sized to permit passage of said stand bearing said casing therethrough into said internal chamber;
   a horizontally transportable closing component sized to said opening for closing off said opening with said metal casing borne by said stand within said internal chamber, and wherein at least part of said auxiliary equipment is integrated into walls of said container unit such that:
   the three components formed by the transportable reactor unit casing and stand, said container unit and said closing component may be transported horizontally either together or separately to allow firstly the container unit to be installed, secondly the reactor unit to be inserted therein by horizontal movement through said container unit opening and the opening of the container unit closed off by a further horizontal movement of said closing component.

2. A nuclear boiler according to claim 1, wherein said closing component contains a swimming bath type storing unit for the used fuel elements.

3. A method of assembly of a modular nuclear boiler on a stationary final operating site, said method including the following steps:
   prefabricating and testing a horizontally transportable reactor unit at a fabricating site, said reactor unit including a casing containing a nuclear reactor, at least one steam generator connected thereto and a horizontally transportable support which insures its stability during both operation and transport;

prefabricating and testing a horizontally transportable container unit at the fabricating site, said container unit comprising walls housing auxiliary equipment for the nuclear reactor and said at least one steam generator and deliminating a closed internal chamber having a closable opening within one of the sidewalls thereof;

prefabricating and testing a horizontally transportable closing component for the opening in said container unit, at the fabricating site;

loading said support borne reactor unit, said container unit and said closing component by horizontal transport from the fabricating site onto a barge;

bringing said barge by water to the final operating site for the modular nuclear boiler;

unloading said container unit from said barge by horizontal transport of the container unit from said barge to said final operating site;

unloading said reactor unit from said barge by horizontal transport of said reactor unit from said barge to said final operating site of the boiler and horizontally inserting it in the nuclear container unit by lateral passage through said opening; and unloading said closing component by horizontal transport of said closing component from said barge to said final operating site and by horizontal passage into said container unit opening to close off said opening and to effect complete containment of said reactor unit by said transportable container unit and said closing component in modular fashion.

* * * * *